United States Patent [19]
Belokin et al.

[11] Patent Number: 6,038,812
[45] Date of Patent: Mar. 21, 2000

[54] VASE WITH SUPPORT FOR DISPLAY

[76] Inventors: Paul Belokin; Martin P. Belokin, both of 7801 I-35 North, Denton, Tex. 76202; Norman P. Belokin, 1606 Oak Ridge Dr., Corinth, Tex. 76205; Linda C. Baxter, 7801-35 North, Denton, Tex. 76202

[21] Appl. No.: 09/157,442

[22] Filed: Sep. 21, 1998

[51] Int. Cl.[7] .......................... A01G 5/00; A63H 13/20; A63H 1/00; B65D 83/00; A61L 9/04
[52] U.S. Cl. ........................ 47/41.01; 40/414; 40/430; 229/7 R; 239/51.5; 446/236
[58] Field of Search ................. 47/41.01, 41.11; 229/7 R; 239/51.5; 446/236; 40/414, 430

[56] References Cited

U.S. PATENT DOCUMENTS

| | | | |
|---|---|---|---|
| 106,262 | 8/1870 | Fine | 446/236 |
| 2,734,312 | 2/1956 | Vaghi | 47/41.01 |
| 3,767,104 | 10/1973 | Bachman et al. | 229/7 R |
| 4,156,835 | 5/1979 | Dearling | 239/51.5 |
| 4,901,458 | 2/1990 | Belokin et al. | 40/414 |
| 4,949,486 | 8/1990 | Belokin et al. | 40/414 |
| 5,146,702 | 9/1992 | Belokin, Jr. | 40/430 |

*Primary Examiner*—Peter M. Poon
*Assistant Examiner*—Francis T. Palo
*Attorney, Agent, or Firm*—Jack A. Kanz

[57] ABSTRACT

A vase or similar container which includes a display support is formed by a tubular member having an open upper end, a closed lower end, a base support included in the closed lower end and an upper support disposed within the upper region of the tubular member. A vertically disposed elongated support rod is supported in the lower end of the tubular member and extends upwardly through the upper mounting aperture to support an electric motor for driving an active display.

12 Claims, 2 Drawing Sheets

VASE WITH SUPPORT FOR DISPLAY

This invention relates to supports for animated displays. More particularly, it relates to containers such as floral vases and the like which incorporate support means for active or animated display devices and the like.

BACKGROUND OF THE INVENTION

Active displays are commonly used to attract attention to retail products, for amusement and for aesthetic decoration. Typically, such active displays are powered by small electric motors which are preferably concealed. One such arrangement is disclosed in U.S. Pat. No. 5,146,702 issued to Paul Belokin, Jr. entitled Display Having An Electric Motor For Simulating A Flying Object, the specification of which is incorporated herein by reference.

In order to support the active portion of the display in the desired relationship to the display, attempts are usually made to incorporate or conceal the motive means and its related power source within the body of the display. However, when the display includes a container such as a vase or the like which may contain a liquid such as water, care must be taken to avoid submergence of the drive motor and its associated power supply. The vase, however, must also accommodate insertion and arrangement of individual stems of foliage and the like without interfering with the active display portion. The active portion, and its associated power means, must be readily assembled and installed without adversely affecting the normal use of the container and must be easily removeable for re-use, storage, etc.

SUMMARY OF THE INVENTION

In accordance with the invention a vase or similar container is provided with means for supporting an active display. The vase is formed by an elongated tubular member having an upper end, a closed lower end and a sidewall which continuously extends from the open upper end to the closed lower end. A base support is mounted in the bottom of the closed lower end which includes a lower mounting aperture centrally located within the lower end. The elongated tubular member is preferably formed as a unitary molded plastic part which includes the base support. A stem divider is used to provide an upper support member. The upper support member includes a centrally located upper mounting aperture and a plurality of brace members which are angularly spaced to extend radially outwardly from the upper mounting aperture to the support ring. The upper brace members are spaced to provide passages for passing display items such as stems of flowers and the like into the elongated tubular member in decorative arrangements. A vertical support rod fits snugly within the lower mounting aperture so that it is non-rotatably mounted to the elongated tubular member and extends upwardly through the upper mounting aperture in the upper end of the elongate tubular member. The drive motor for an active display may thus be supported on the upper end of that support rod. The drive motor and its associated power source may be suspended in the upper portion of the vase but concealed by the flower arrangement or the like. The support structure, however, is easily removed when desired. Other features and advantages of the invention will become more readily understood from the following description taken in conjunction with the appended claims and attached drawing in which:

DESCRIPTION OF THE PREFERRED EMBODIMENTS

Figure 3:
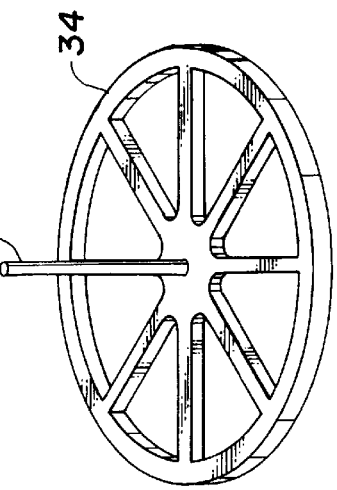
FIG. 3 is a partial perspective view of the support rod and a upper support ring shown in FIG. 1.

Throughout the several views of the drawing like numerals are used to indicate like parts. The drawing figures are not to scale but are intended to disclose the inventive concepts by illustration and are incorporated herein to illustrate presently preferred embodiments of the invention. The drawing should not be construed as limiting the invention to the illustrated and described embodiments.

Figure 1:
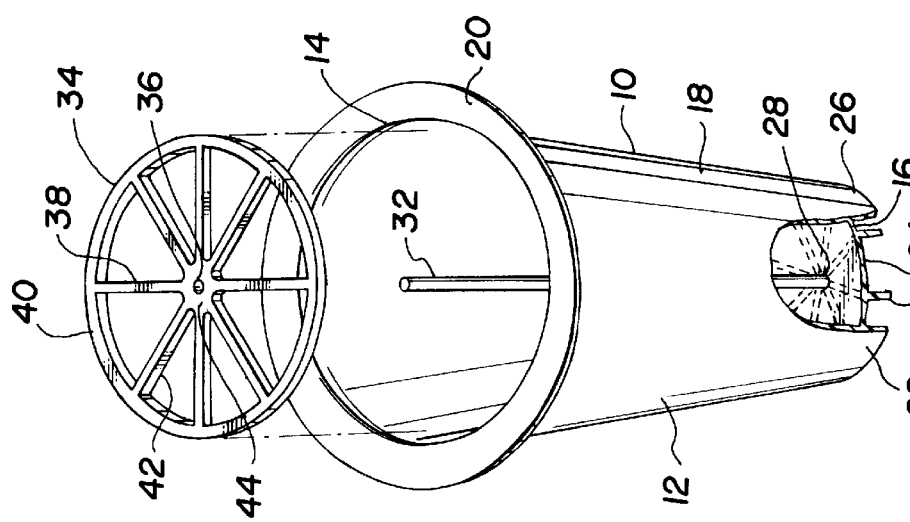
FIG. 1 is a partially exploded, partial cut-away perspective view of a preferred embodiment of the present invention.

In FIG. 1 the invention is illustrated in a partially exploded, partial cut-away perspective view of a vase 10 incorporating the principles thereof. The vase 10 is molded of plastic and defined by an elongate tubular member 12 having an open upper end 14 and a closed lower end 16. A sidewall 18 extends continuously from the closed lower end 16 to the open upper end 14 and defines an upper lip 20. A lower periphery 22 of the sidewall 18 extends below the closed lower end 16 of the vase 10. A base support 24 (defined by the lower region 26 of the vase 10) is integrally formed as a monolithic unit with the closed lower end 16 of the vase 10 and includes a lower mounting aperture 28 and lower brace support members 30. The lower brace support members 30 extend radially outwardly from the lower mounting aperture 28 to the sidewall 18 in an angularly spaced arrangement. Preferably, eight lower brace support members 30 are provided which are integrally molded into the vase 10 and with the base support 24 as a monolithic piece. Obviously, the base support could be formed as a separate unit insertable into the vase 10 as desired. The lower mounting aperture 28 is sized to snugly receive a vertically disposed support rod 32. The support rod 32 is preferably a rigid rod of circular cross-section. A removeable stem divider 34 defines an upper support which includes an upper mounting aperture 36, a plurality of upper brace members 38 and a support ring 40. Preferably, the stem divider 34, the upper mounting aperture 36, the upper brace members 38 and the support ring 40 are integrally molded as a single piece of plastic. The upper mounting aperture 36 extends through a central portion 44 of the stem divider 34. The brace members 38 extend radially outwardly from the upper mounting aperture 36 and are angularly spaced to provide passages 42 therebetween.

Figure 2:
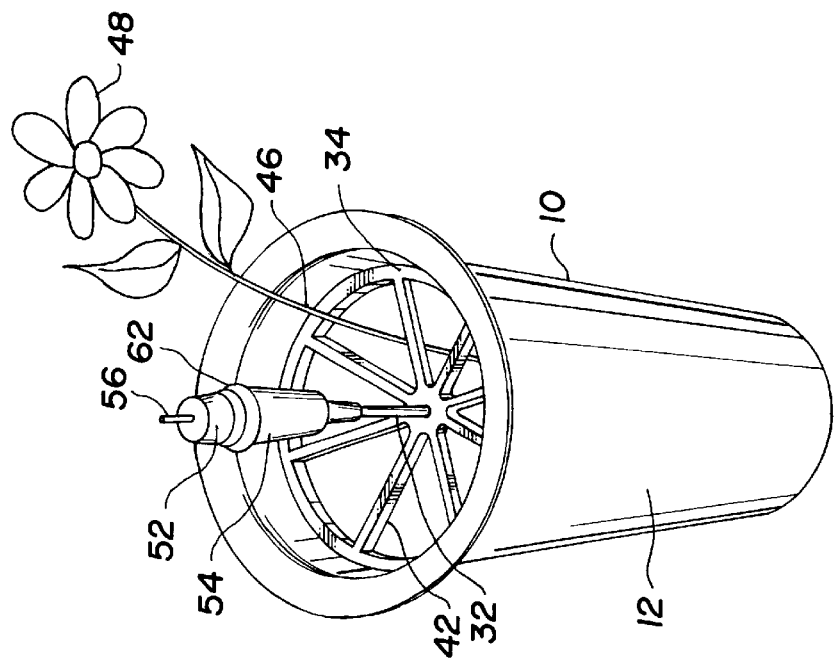
FIG. 2 is a perspective view of the embodiment of FIG. 1 illustrating the placement of a flower and an electric motor with a power supply mounted therein.

In FIG. 2 the vase 10 is illustrated with the display support structure positioned therein and a motor 52 mounted on the support rod 32. Passages 42 between the spaced upper brace members 38 allow insertion of stems 46 of flowers 48 or the like into the vase 10. The motor 52 and the power supply 54 are preferably non-rotatably mounted on the top upper end of the support rod 32. A motor shaft 56 projects from the top of motor 52. The power supply 54 is preferably a storage battery but in other embodiments may be provided by a transformer with an electrical connection to a power outlet or the like.

FIG. 3 is a partial perspective view of the vertical support rod 32 assembled in the stem divider 34. The vertical support rod 32 fits through the stem divider 34 in a loosely fitting relationship so that the stem divider 34 is slidable along and may be rotated about the vertical support rod 32. The upper mounting aperture 36 is sized for slidably receiving the support rod 32 and may be moved along the length of the support rod 32 for removal from the tubular member 12. Thus the stem divider 34 also provides a loosely fitting centralizer for centering the support rod 32 within the open upper end 14 of the tubular member 12.

The stem divider 34 may be withdrawn from around the vertical support rod 32 and removed from the vase 10.

Figure 4:
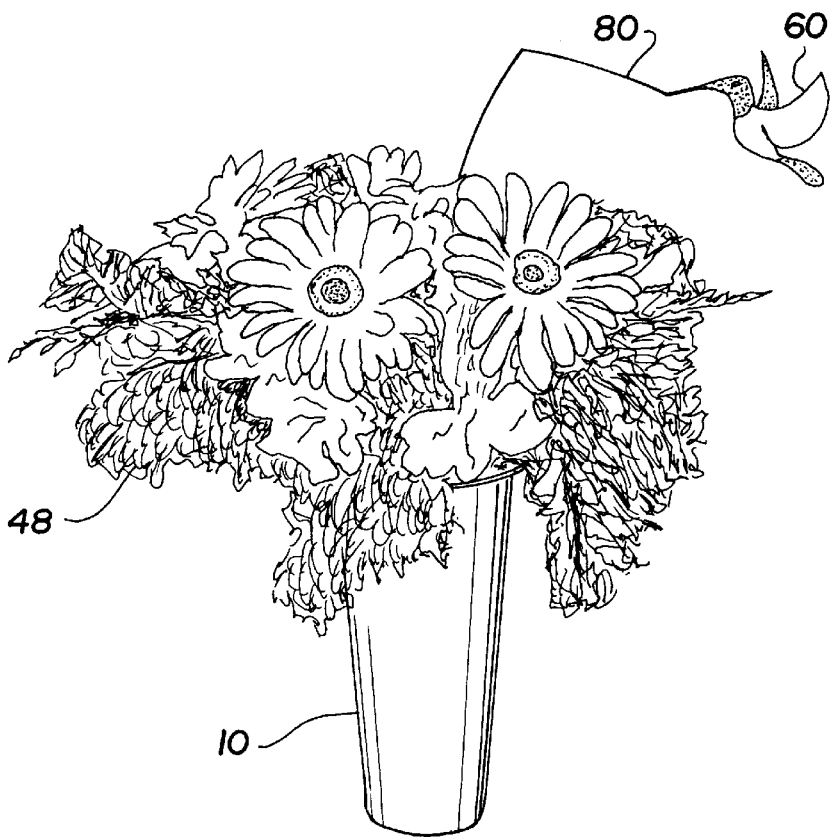
FIG. 4 is a perspective view of a vase incorporating the invention having a floral arrangement disposed therein and supporting a winged decorative object.

FIG. 4 illustrates the vase 10 with an arrangement of flowers 48 therein. A decorative object 60, such as a simulated hummingbird or the like, is mounted on a thin wire 80 for moving about the vase 10 in a vigorous undulating action. The wire 80 is preferably of such a diameter that it can be seen only by close examination. A piano wire 80 of about 0.015 inch gauge is suitable.

Figure 5:
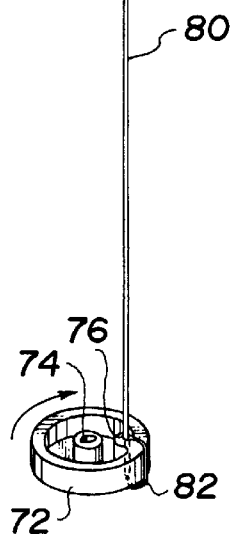
FIG. 5 is a perspective, enlarged view of a winged decorative object display mounted to a driven member.

FIG. 5 is a side elevational view of a typical active portion of an active display having a winged decorative object 60 (such as a simulated butterfly) mounted to the upper terminal end of wire 80. A driven member 72 is provided with a central hole 74 for rigidly, or non-rotatably, mounting to the end of the motor shaft 56 (shown in FIG. 2). The driven member 72 has a wire mounting hole 76 displaced toward its periphery and on a radius line 78 with respect to the rotatable center of the driven member 72 defined by the central hole 74. The wire mounting hole 76 is larger than wire 80 to provide a certain amount of freedom so that the wire 80 will not fail because of fatigue due to repeated bending.

Figure 6:
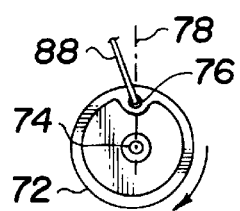
FIG. 6 is a plan view of the driven member shown in FIG. 5 showing the trailing position of the support wire as it rotates.

A top view of the driven member 72 is shown in FIG. 6. The wire mounting hole 76 is spaced from the central mounting hole 74 in which the motor shaft 56 is received to fixedly mount the driven member 72 on the motor shaft 56. When the driven member 72 is rotated in a clockwise direction the upper portion 88 of wire 80 will trail the radius line 78 as shown in FIG. 6.

Figure 7:
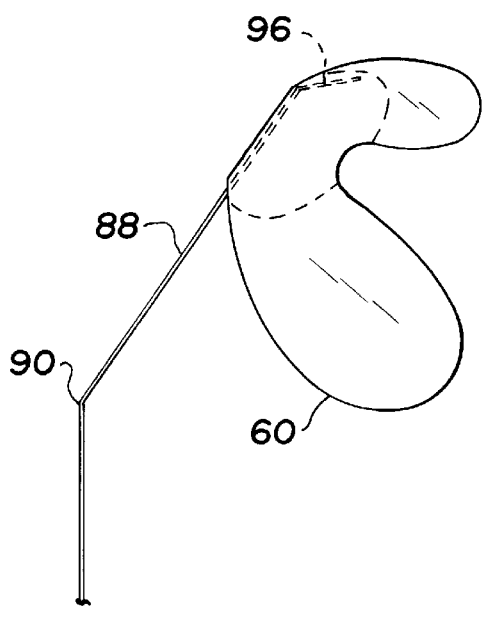
FIG. 7 is a fragmentary, enlarged view of the display driving unit shown in FIG. 2.
Figure 7:
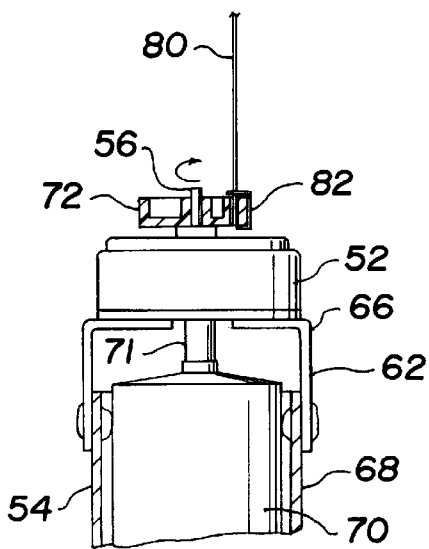

FIG. 7 illustrates the structure of drive assembly 62 shown in FIG. 2. The winged decorative object 60 and the wire 80 are mounted to the top of the drive assembly 62 and drive assembly 62 is mounted atop the support rod 32. Drive assembly 62 preferably includes a conventional motor 52 which is pivotally attached by bracket 66 to the power supply 54. Preferably, the power supply 54 is provided conventional by storage batteries 70 which are located in a cylindrical battery holder 68. A spring (not shown) located in the bottom of the battery holder 68 urges the batteries 70 upwardly so that the uppermost battery contacts the downwardly extending contact 71 of the motor 52. Drive shaft 56 extends upwardly from the motor 52 and is driven thereby in conventional manner. The shaft 56 can be rotated in either direction.

When the rotatably driven member 72 is rotated as shown by the arrow in FIG. 6, the offset upper bent portion 88 of the wire 80 assumes a rearward rake or angle in respect to the radius line 78 defined by holes 74 and 76 of driven member 72. The wire 80 is anchored on the driven member 72 in one direction so that when it is rotated, proper fluttering and undulating action of the decorative object 60 occurs.

In the particular embodiment described, a vase is provided by a tubular member which is integrally molded to include a lower base support having a lower aperture in which a solid, elongated support rod is non-rotatably mounted. The tubular member, although illustrated as cylindrical in cross-section, may take any suitable tubular form such as rectangular, hexagonal, etc. Similarly, the diameter of vase 10 may vary as desired.

While the vase 10 and support structure has been described as made from plastic, any suitable material may be used. Similarly, while the support rod is described as centrally mounted, the term "centrally" should not be limited to the geometric center of the vase 10. "Centrally mounted" is intended to include location of the support post anywhere within the peripheral dimensions of the vase 10.

It should be understood that although the invention has been described with particular reference to active displays as disclosed in U.S. Pat. No. 5,146,702, the invention is not so limited. The principles thereof may be applied to support various other animated or active displays in a container, whether or not powered by an internal motor.

It will be apparent from the foregoing that the principles of the invention may be used to form various display structures comprising a container and support for an active display. It is to be understood, therefore, that even though numerous characteristics and advantages of the invention have been set forth in the foregoing description together with details of the structure and function of the invention, this disclosure is to be considered illustrative only. Various changes and modifications may be made in detail, especially in matters of shape, size, arrangement and combination of parts, without departing from the spirit and scope of the invention as defined by the appended claims.

What is claimed:

1. A vase or other container comprising:
    (a) a tubular member having a open upper end, a closed lower end and a sidewall extending between said open upper end and said closed lower end; and
    (b) support means mounted in said tubular member comprising:
        (i) a base support disposed in a lower region of said tubular member;
        (ii) an upper support disposed in an upper region of said tubular member having a plurality of open passages extending therethrough; and
        (iii) a vertically disposed support post centrally located within said base support and said upper support and extending upwardly from upper support.

2. A vase or other container as defined in claim 1 wherein said support post is non-rotatably mounted within said base support.

3. A vase or other container as defined in claim 2 wherein said upper support is rotatably moveable relative to said support post.

4. A vase or other container as defined in claim 1 wherein said base support comprises a plurality of brace members which are angularly spaced around said closed lower end and extend radially outwardly from said support post to said sidewall.

5. A vase or other container as defined in claim 1 wherein said upper support comprises an outer ring member and a plurality of brace members which extend radially outwardly from said support post.

6. A vase or other container as defined in claim 1 further comprising an electric motor having a rotating motor shaft and a motor housing, one of which is non-rotatably mounted on the upper end of said support post and the other of which extends above said electric motor; and a power supply for powering said electric motor.

7. A vase or other container as defined in claim 6 further comprising a rotatably driven member having:
- a main body portion which is mounted directly to said motor for rotation relative to said tubular member; and
- an attachment portion having an attachment hole for receiving one end of a mounting wire in a loosely secured arrangement so that said mounting wire passes through said attachment hole and is loosely secured to the attachment portion for rotation relative to said rotatably driven member.

8. A vase or other container as defined in claim 1 wherein said upper support includes an outer ring member and a plurality of brace members which extend radially outwardly from said support post to said outer ring member and wherein said outer ring member is sized to fit interiorly within said tubular member in a position intermediate said open upper end and said closed lower end.

9. A vase or other container comprising:
- (a) a tubular member having a open upper end, a closed lower end and a sidewall extending between said open upper end and said closed lower end;
- (b) a base support disposed in a lower region of said tubular member;
- (c) an upper support disposed in an upper region of said tubular member having a plurality of open passages extending therethrough;
- (d) a vertically disposed support post centrally located within said base support and said upper support and extending upwardly from said upper support;
- (e) an electric motor having a rotating motor shaft and a motor housing, one of which is non-rotatably mounted to the upper end of said support post and the other of which extends above said electric motor;
- (f) a power supply for powering said electric motor;
- (g) a mounting wire having a first end mounted to one of said motor housing and said rotary motor shaft of said electric motor for rotation relative to said tubular member and a second end extending upwardly above said tubular member; and
- (h) a decorative object mounted to a second end of said wire.

10. A vase or other container as defined in claim 9 further comprising a rotatably driven member mounted on the rotating end of said electric motor and said shaft having:
- a main body portion which is mounted directly to said rotating end of said electric motor and said shaft for rotating relative to said tubular member; and
- an attachment portion having an attachment hole for receiving said first end of said mounting wire in a loosely secured arrangement so that said mounting wire passes through said attachment hole and is loosely secured to the attachment portion for rotation relative to said rotatably driven member.

11. An active display comprising:
- (a) an elongate tubular member having a open upper end, a closed lower end and a sidewall which extends continuously from said open upper end to said closed lower end;
- (b) a base support mounted in said tubular member at said closed lower end having a lower mounting aperture which is centrally located in said lower end;
- (c) a vertically disposed support rod which fits snugly within said lower mounting aperture for non-rotatably mounting to said elongate tubular member and which extends upwardly into said upper end of said elongate tubular member;
- (d) an upper support having a support ring, an upper mounting aperture which is centrally located within said support ring for receiving said support rod, and a plurality of brace members angularly spaced around said upper mounting aperture which extend radially outwardly from said upper mounting aperture to said support ring and define passages therebetween;
- (e) an electric motor non-rotatably mounted to an upper end of said support rod having a rotary motor shaft which extends above said electric motor;
- (f) a power supply for powering said electric motor;
- (g) a thin mounting wire having a first end connected to said motor shaft of said electric motor and a said second end extending upwardly above said elongate tubular member; and
- (i) a decorative object mounted to said second end of said wire.

12. An active display as defined in claim 11 wherein said decorative object is a simulated winged creature.

* * * * *